(12) United States Patent
Howell et al.

(10) Patent No.: US 10,065,729 B2
(45) Date of Patent: Sep. 4, 2018

(54) CONTROL METHOD AND APPARATUS FOR AN AIRCRAFT WHEN TAXIING

(71) Applicants: Airbus Operations Limited, Bristol (GB); Airbus Operations SAS, Toulouse (FR)

(72) Inventors: George Howell, Bristol (GB); Louis-Emmanuel Romana, Toulouse (FR)

(73) Assignees: Airbus Operations Limited, Bristol (GB); Airbus Operationa (SAS), Toulouse (FR)

(*) Notice: Subject to any disclaimer, the term of this patent is extended or adjusted under 35 U.S.C. 154(b) by 216 days.

(21) Appl. No.: 14/965,592

(22) Filed: Dec. 10, 2015

(65) Prior Publication Data

US 2016/0167772 A1 Jun. 16, 2016

(30) Foreign Application Priority Data

Dec. 10, 2014 (EP) .................................. 14290374

(51) Int. Cl.
 *B64C 25/50* (2006.01)
 *B64C 25/40* (2006.01)
 (Continued)

(52) U.S. Cl.
 CPC ............. *B64C 25/50* (2013.01); *B64C 25/34* (2013.01); *B64C 25/405* (2013.01); *B64C 25/48* (2013.01); *G05D 1/0202* (2013.01); *Y02T 50/823* (2013.01)

(58) Field of Classification Search
 CPC .................................................... B64C 25/50
 See application file for complete search history.

(56) References Cited

U.S. PATENT DOCUMENTS

| 4,503,553 A | 3/1985 | Davis |
| 5,680,125 A | 10/1997 | Elfstrom et al. |

(Continued)

FOREIGN PATENT DOCUMENTS

| CN | 202226064 | 5/2012 |
| CN | 103134698 | 6/2013 |

(Continued)

OTHER PUBLICATIONS

International Search Reported cited in GB1509383.4 dated Nov. 20, 2015, three pages.

(Continued)

*Primary Examiner* — Brian M O'Hara
*Assistant Examiner* — Michael B Kreiner
(74) *Attorney, Agent, or Firm* — Nixon & Vanderhye P.C.

(57) ABSTRACT

A method of controlling the motion of a turning aircraft during taxiing on the ground, the aircraft having a steerable landing gear, for example a nose landing gear, operating in a free-to-caster mode, includes (a) ascertaining the rotational position (Θ) of the steerable landing gear relative to the longitudinal axis (L) of the aircraft (b) receiving a control instruction that would, if effected, continue turning of the aircraft in the same direction away from the longitudinal axis, and (c) modifying the control instruction so that the angle between the rotational position of the steerable landing gear and the longitudinal axis will be lower than the angle that would otherwise be observed had the control instruction been effected and not so modified. The risk of damage to the steerable landing gear through over-steering may thus be reduced.

11 Claims, 3 Drawing Sheets

(51) Int. Cl.
*B64C 25/48* (2006.01)
*B64C 25/34* (2006.01)
*G05D 1/02* (2006.01)

(56) References Cited

U.S. PATENT DOCUMENTS

| | | |
|---|---|---|
| 8,521,365 B2 | 8/2013 | Chatrenet et al. |
| 2012/0158218 A1 | 6/2012 | Funabiki et al. |
| 2014/0244076 A1 | 8/2014 | Murthy et al. |

FOREIGN PATENT DOCUMENTS

| | | |
|---|---|---|
| WO | 2007054715 | 5/2007 |
| WO | 2007110566 | 10/2007 |
| WO | 2014076486 A1 | 5/2014 |
| WO | 2014184608 A2 | 11/2014 |

OTHER PUBLICATIONS

International Search Report cited in GB15198778.5 dated Apr. 19, 2016, five pages.

CONTROL METHOD AND APPARATUS FOR AN AIRCRAFT WHEN TAXIING

RELATED APPLICATION

This application claims priority to European Patent Application No. 14290374.9, filed on Dec. 10, 2014, the entirety of which is incorporated by reference.

BACKGROUND OF TH INVENTION

The present invention concerns a control method and apparatus for an aircraft when taxiing. More particularly, but not exclusively, this invention concerns a method of controlling the motion of an aircraft during taxiing on the ground. The invention also concerns a control system for use in performing such a method, and associated software. The invention also concerns an aircraft employing such a control system.

When controlling the motion of an aircraft during taxiing on the ground, turning of the aircraft may be controlled by means of a steerable landing gear. The present invention principally concerns control of the turning of the aircraft when a steerable landing gear (for example the principal steerable landing gear) is operating in a "free-to-caster" mode. Control systems have been proposed in the prior art concerning how to control the steering/turning of the aircraft in various ways.

WO 2014/076486 concerns a landing gear force and moment distributor system for a left and right main landing gear (MLG) of an aircraft. Each MLG comprises a bogie having an actuator arranged to brake and/or drive one or more wheels. The force and moment distributor system comprises a distribution module arranged to receive an input demand including (a) a longitudinal force input demand corresponding to a desired braking or driving force along the longitudinal axis for the landing gear and (b) a moment input demand corresponding to a desired moment about the vertical axis for the landing gear (e.g. a steering/turning amount). The received input demand is used to calculate an output command comprising, for each bogie, (a) a longitudinal force output command corresponding to a braking or driving force along the longitudinal axis to be applied to the bogie to achieve the longitudinal force input demand, and (b) a moment output command corresponding to a braking or driving force along the longitudinal axis to be applied to the bogie to achieve the moment input demand.

U.S. Pat. No. 8,521,365 relates to a method for providing lateral control of a taxiing aircraft with left and right main landing gear assemblies and a steerable nose landing gear (NLG), when the NLG is in a "free-to-caster" mode. In such a mode, the NLG aligns with the direction of travel of the aircraft but cannot be used to control steering of the aircraft; other means must be used. In U.S. Pat. No. 8,521,365, command orders are received relating to a desired amount of steering of the NLG wheel using the same apparatus as would be used when the NLG is in a steerable mode (in which mode, such command orders are used to directly steer the NLG with actuators provided for such a purpose). Such command orders are converted so as to control the MLG brakes/engines to cause the lateral movement of the caster aircraft corresponding to the same lateral movement that would be caused had the command orders been used to effect direct steering of the NLG.

The present invention seeks to provide an improved a method of controlling the motion of an aircraft during taxiing on the ground, when the steerable landing gear is operating in a "free-to-caster" mode.

SUMMARY OF THE INVENTION

The present invention provides a method of controlling the motion of an aircraft during taxiing on the ground. The invention has application in relation to an aircraft when taxiing, in particular a civil or military, passenger or freight transport airplane. The invention may have application in relation to an unmanned aircraft. The controlling of the motion of the aircraft may include generating a yaw moment (a moment about to the vertical axis of the aircraft) allowing lateral control of the taxiing aircraft. The aircraft comprises a steerable landing gear comprising one or more wheels positioned at the fore end of the aircraft. The method of the invention has particular application when the steerable landing gear operates in a "free-to-caster" mode during performance of the method. The aircraft also comprises one or more left main landing gears, each comprising one or more wheels and being positioned rearwardly and to the left of the steerable landing gear, and one or more right main landing gears each comprising one or more wheels and being positioned rearwardly and to the right of the steerable landing gear. The method of the invention is performed whilst the rotational position of the steerable landing gear is non-parallel to a longitudinal axis of the aircraft and the aircraft is turning in a direction away from the longitudinal axis. The longitudinal axis of the aircraft will typically be parallel to the axis of the fuselage. In the case where the aircraft does not have a fuselage having a readily discernible axis, the longitudinal axis may be defined as an axis that is parallel to the direction in which the aircraft moves whilst on flat level ground and moving forwards without any steering/turning. The method comprises a step of ascertaining the rotational position of the steerable landing gear relative to the longitudinal axis of the aircraft. The method comprises a step of receiving a control instruction that would, if effected, continue turning of the aircraft in the direction away from the longitudinal axis. The method may comprise a step of modifying the control instruction, for example if the rotational position meets certain criteria (e.g. if the rotational position is greater than a threshold angle). For example, the control instruction may be received by a control unit, or other control system, which may then modify the control instruction before it is forwarded on to those parts of the aircraft being so controlled. The method of modifying the control instruction, if so performed, advantageously includes so modifying the control instruction that the angle between the rotational position of the steerable landing gear and the longitudinal axis will be lower than the angle that would otherwise be observed had the control instruction been effected and not so modified. Embodiments of the method of the invention may thus provide a means for reducing the risk of damage to the steerable landing gear through over-steering. A method of protecting a nose landing gear of an aircraft against damage through over-steering may thus be provided.

The steerable landing gear may be in the form of a nose landing gear (NLG). There may be an NLG rotational position angle beyond which there is significant risk of damage occurring to the NLG assembly (which may be referred to as the maximum allowable NLG angle). It may be desirable therefore to avoid cases in which the NLG is turned to an excessive steering angle (e.g. an angle beyond the maximum allowable NLG angle). Thus, by modifying the control instruction to reduce the amount by which the NLG rotational position might otherwise increase, the risk of damage to the NLG assembly may be reduced. It may also be the case that by reducing the risk of damage to the NLG assembly during use, the design of the NLG assembly may be changed to make it more efficient whilst not increasing the risk of such damage. It may be possible for example to introduce usage of an NLG assembly with a lower maximum allowable NLG angle, without prejudicing safety.

There may be an NLG rotational position angle beyond which it is certain that damage would occur. There may for example be a mechanical limit. In such a case, the maximum allowable NLG angle may be deemed to be equal to the NLG rotational position angle beyond which damage will occur. At such an angle, parts of the NLG assembly may be unable to move to allow a greater NLG rotational position angle without deformation. It may be that the maximum allowable NLG angle is deemed to be less than (say 90% of) the angle beyond which damage will occur to allow for a safety margin.

The method of the present invention facilitates embodiments in which the risk of the rotational position of the steerable landing gear exceeding the maximum allowable NLG angle is reduced. It may be that, for all practical purposes, the method of the present invention facilitates embodiments in which the risk of the rotational position of the steerable landing gear exceeding the maximum allowable NLG angle is substantially eliminated under normal operating conditions.

The present invention has particular application when the steerable landing gear (e.g. the NLG) is operating in a free-to-caster mode. It will be appreciated that the NLG will typically also be operable in a directly steerable mode, in which mode, actuators are commanded to rotate and directly steer the NLG. The steerable landing gear may operate in a free-to-caster mode when it is otherwise not possible to operate in the directly steerable mode, for example in the case of a failure with the equipment required to operate the steerable landing gear in the directly steerable mode. A failure in the steering actuators may be one such fail-mode, for example. The steering actuators may effectively be disengaged in the free-to-caster mode. The one or more steering actuators may be located on or near the steerable landing gear.

It may be that the amount by which the control instruction is modified is greater at a first angle between the rotational position of the steerable landing gear and the longitudinal axis than at a second angle between the rotational position of the steerable landing gear and the longitudinal axis, the first angle being greater than the second angle. Both the first angle and the second angle may be greater than the threshold angle. The amount by which the control instruction is modified may be yet greater at a third angle between the rotational position of the steerable landing gear and the longitudinal axis than at the first angle between the rotational position of the steerable landing gear and the longitudinal axis, the third angle being greater than the first angle. For example, between the threshold angle and a higher angle, the amount by which the control instruction is modified may increase monotonically with increasing angle between the rotational position of the steerable landing gear and the longitudinal axis. It may be that the higher angle may be equal to the maximum allowable steerable landing gear angle. Increasing the amount of modification at higher angles of steering may assist in reducing the chance of "runaway"—where in the dynamic system in question the steering angle of the NLG might otherwise tend (and possibly accelerate) towards the maximum allowable angle. Between the threshold angle and the higher angle, the amount by which the control instruction is modified may increase proportionally with increasing angle between the rotational position of the steerable landing gear and the longitudinal axis. Having a proportional relationship is a simple yet potentially very effective feedback system that allows good control of the NLG steering angle.

It may be that the step of receiving the control instruction is performed such that the control instruction, if effected, would increase the angle between the rotational position of the steerable landing gear and the longitudinal axis. It may be that the step of modifying the control instruction is only performed if the control instruction so received, would, if otherwise effected, increase the angle between the rotational position of the steerable landing gear and the longitudinal axis.

It may be that if the rotational position is lower than the threshold angle, the control instruction is not modified by the method of the invention.

It may be that the rotational position of the steerable landing gear is ascertained, at least in part, by ascertaining the direction of travel of the aircraft and deducing the likely rotational position of the steerable landing gear (assuming no slip between the wheel and the ground).

It may be that the rotational position of the steerable landing gear is ascertained, at least in part, by means of a sensor, for example one or more rotation-measuring units. Each rotation-measuring unit may comprise a Rotary Variable Differential Transducer. A typical aircraft may have at least one Rotary Variable Differential Transducer (RVDT) fitted to the steerable landing gear (e.g. the nose landing gear). An RVDT provides an output signal, typically a voltage, that is dependent on, typically being proportional to, the angle of the rotational position of the steerable landing gear, and is typically linked with the hydraulics of the aircraft steering system. The or each rotation-measuring unit may be located on the steerable landing gear.

Mention is made herein to the left and right of the aircraft. The port side of the aircraft will be deemed to be the left side. The starboard side of the aircraft will be deemed to be the right side.

It may be that the aircraft comprises at least one engine for providing forward thrust during flight and the motion of the aircraft on the ground is, at least partly, powered by means of operating said at least one engine. Said at least one engine may be a jet engine. It may be that the forward motion of the aircraft is, at least partly, provided by its own momentum, for example after when the aircraft has touched down. It may be that none of the landing gear wheels are directly powered, during performance of the method.

The control instruction will typically be to effect a turning moment (about a substantially vertical axis) on the aircraft. The control instruction will typically cause signals to be transmitted to one or more aircraft systems that can affect the turning moment on the aircraft, such as for example the engines, the brakes, and aerodynamic surfaces.

The control instruction received may comprise an instruction to change the thrust provided by one or more engines for providing forward thrust during flight.

The control instruction received may comprise an instruction to change an aerodynamic control surface on the aircraft, for example a rudder and/or spoilers on the aircraft.

The control instruction received may comprise an instruction to change the amount of braking applied to said one or more left main landing gears. The control instruction received may comprise an instruction to change the amount of braking applied to said one or more right main landing gears.

It may be that the control instruction received comprises an instruction to effect differential braking to the main landing gears (e.g. a different amount of braking to the left main landing gear(s) as compared to the amount of braking to right main landing gear(s)). In the case where the control instruction received comprises an instruction to effect differential braking to the main landing gears, the braking actually applied to the or each main landing on the side (the left or right) instructed to effect most braking is reduced from the amount instructed by a reduction that is calculated in accordance with the amount by which the threshold angle is exceeded. It may be that the reduction in the braking applied is proportional to the amount by which the threshold angle is exceeded. The amount of braking applied may be measured, and therefore reduced proportionately, with reference to the braking torque applied. The amount of braking applied may be measured, and therefore reduced proportionately, with reference to the hydraulic braking pressure.

It may be the amount of braking on one side is reduced so as to effect a reduction in the rotational position of the steerable landing gear (in the case where the rotational position is greater than a threshold angle), even if the control instruction received comprises an instruction to effect differential braking to the main landing gears with less braking being instructed on that one side in comparison to the other.

It may be that the step of modifying the control instruction includes reducing the amount of turning that would otherwise be effected by both changing the control instruction insofar as it affects the left of the aircraft and changing the control instruction insofar as it affects the right of the aircraft (from example increasing something on one side, whilst making a corresponding reduction in respect of the other side).

It may be that the control instruction received comprises an instruction to effect at least one of (a) differential braking to the main landing gears and (b) differential thrust from left and right engines of the aircraft, for example such that there is an imbalance between the forces to be applied to the left of the aircraft as compared to the right of the aircraft; for example, the control instruction being to effect a turning moment on the aircraft. The step of modifying the control instruction may in such a case include reducing the imbalance by changing the control instruction insofar as it affects the left of the aircraft and also reducing the imbalance by changing the control instruction insofar as it affects the right of the aircraft. For example, braking on the left MLG may be reduced whist increasing the braking on the right MLG.

It may be that the control instruction received comprises an instruction that would effect braking and turning of the aircraft and the step of modifying the control instruction results in substantially the same overall amount of braking, but reduced turning. Maintaining the same global amount of braking as instructed may further enhance safety and predictability of the control system.

It may be that the aircraft is configured such that the steerable landing gear is operable in a directly steerable mode. In such a case, it may be that the command instructions for controlling the rotational position of the steerable landing gear are provided by means of a human-operated moveable steering device (e.g. a tiller, steering wheel or similar) in the cockpit. The control instruction received may originate from a human operator of the aircraft operating the same human-operated moveable steering device (i.e. when the steerable landing gear is operable in a free-to-caster mode, and not in the directly steerable mode).

It may be that the control instruction received is provided from an electronic aircraft control system seeking to effect a desired amount of turning. Such an electronic aircraft control system may for example receive an instruction from the same human-operated moveable steering device as mentioned above.

It may be that the control instruction received is provided as a result of a human operator seeking to effect steering of the aircraft by means of changing the thrust provided by one or more engines for providing forward thrust during flight. Additionally or alternatively, it may be that the control instruction received is provided as a result of a human operator seeking to effect steering of the aircraft (e.g. imposing a turning moment on the aircraft) by means of changing the amount of braking applied to one or more of the main landing gears. Additionally or alternatively, it may be that the control instruction received is provided as a result of a human operator seeking to effect steering of the aircraft by means of changing an aerodynamic surface on the aircraft. Changing such controls of the aircraft may be performed by means of a direct command. For example, the changing of the amount of braking applied to one or more of the main landing gears may be effected by means of moving one or more levers or pedals in the cockpit by an amount that would, in normal operations, causes a commensurate amount of braking to be applied the wheel(s) concerned.

The method is preferably performed in the case where there is insignificant or negligible slip between the steerable landing gear and the ground. The ground surface may be such that the mu-value (µ-value) is relatively high.

The threshold value used in the method may be predetermined. The threshold value may be a proportion of the maximum allowable steering angle. The maximum allowable steering angle may be greater than 70 degrees. The maximum allowable steering angle will typically be less than 90 degrees and may be less than 85 degrees. The threshold value may be greater than 20 degrees. The threshold value may be less than 60 degrees.

The invention also provides a method of reducing the risk of damage to a nose landing gear (NLG) (and/or seeking to prevent damage to a nose landing gear), particularly when the NLG is in a free-to-caster mode during performance of the method, the method comprising the following steps, performed whilst the rotational position of the NLG is angled away from the longitudinal axis of the aircraft in a given direction: (a) ascertaining the rotational position of the NLG relative to the longitudinal axis of the aircraft, (b) receiving a control instruction that would, if effected, impose a turning moment on the aircraft in the same given direction away from the longitudinal axis, and (c) modifying the control instruction so that the angle between the rotational position of the NLG and the longitudinal axis will be lower than the angle that would otherwise be observed had the control instruction been effected and not so modified. It may be that the modifying step is only performed when the rotational position of the NLG meets certain criteria, for example being greater than a threshold angle. It may be that the magnitude of the modification performed by the modifying step is set in dependence on the rotational position of the NLG.

The method of the invention may have application in cases where the steerable landing gear may be damaged when not in the free-to-caster mode. Thus, there is also provided a method of reducing the risk of damage to a steerable landing gear (SLG), the method comprising the following steps, performed whilst the rotational position of the SLG is angled away from the longitudinal axis of the aircraft in a given direction: (a) ascertaining the rotational position of the SLG relative to the longitudinal axis of the aircraft, (b) receiving a control instruction that would, if effected, impose a turning moment on the aircraft in the same given direction away from the longitudinal axis, and (c) modifying the control instruction so that the angle between the rotational position of the SLG and the longitudinal axis will be lower than the angle that would otherwise be observed had the control instruction been effected and not so modified, the modifying step being performed to protect against damage to the SLG. It may be that the modifying step is only performed when the rotational position of the SLG meets certain criteria, for example being greater than a threshold angle. It may be that the magnitude of the modification performed by the modifying step is set in dependence on the rotational position of the SLG. The control instruction may include an instruction to change the steering angle of the SLG. The control instruction may include an instruction to change the turning of the aircraft by means other than changing the steering angle of the SLG.

The invention also provides an aircraft steering control system for performing a method of the invention in accordance with any aspect of the present invention as claimed or described herein, including any optional features relating thereto.

The invention also provides an aircraft steering control system for controlling the turning of an aircraft when taxiing (preferably when the aircraft nose landing gear is in free-to-caster mode). Such an aircraft steering control system may be configured to perform the method of controlling the motion of an aircraft in accordance with any aspect of the present invention as claimed or described herein, including any optional features relating thereto. The control system may comprise a module for ascertaining the angle of the rotational position of the steerable landing gear relative to the longitudinal axis of an aircraft. The control system may comprise a control unit configured to modify a control instruction to effect reduced turning of the aircraft in the event that the angle ascertained by said module meets certain criteria (for example, in the event that the angle so ascertained exceeds a given threshold), so as to reduce the risk of excessive steering. The control unit may be configured to receive an indication (for example data or other type of signal) of the angle of the rotational position of the steerable landing gear relative to the longitudinal axis of an aircraft.

The invention also provides an aircraft including a control system in accordance with any aspect of the present invention as claimed or described herein, including any optional features relating thereto.

The invention also provides a computer program product configured to cause, when the computer program is executed, a computer implemented aircraft steering control system to perform the step of modifying of the control instruction in accordance with any aspect of the present invention as claimed or described herein, including any optional features relating thereto.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION OF THE INVENTION

Figure 1:
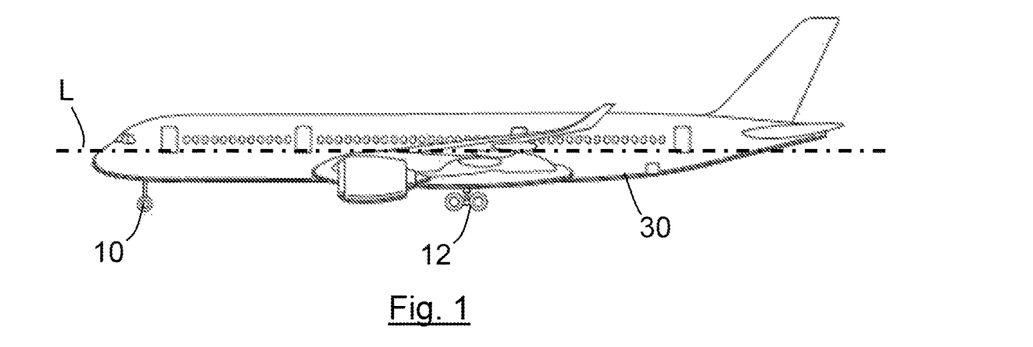
FIG. 1 shows an aircraft including a steerable nose landing gear controlled according to an embodiment of the invention.

FIG. 1 shows an aircraft 30 according to an embodiment of the invention. The aircraft has a nose landing gear (NLG) assembly 10 and two main landing gear (MLG) assemblies 12 (only the left MLG being visible in FIG. 1). The NLG 10 is a steerable landing gear. The MLGs 12 include a left MLG and a right MLG, each MLG being positioned rearwardly and laterally of the NLG. The landing gear assemblies each comprise wheels which support the aircraft when it is on the ground. The MLG assemblies each include brake actuators which are operable to provide a braking force to decelerate the wheels of the MLG. The wheels of the MLG are supported on a bogie.

The NLG assembly 10 is positioned forward of the centre of gravity of the aircraft. The MLG assemblies 12 are positioned rearward of the centre of gravity. The NLG and MLG landing gears are all retracted when the aircraft is in flight, and are extended shortly before landing.

The NLG assembly 10 has a pair of steerable wheels which may be rotated together by a steering actuator to steer the aircraft. The nose wheel angle is defined as the angle between the direction in which the steerable wheels are facing (that is the direction in which the wheels roll in a direction perpendicular to the axis of rotation) and a longitudinal axis L of the aircraft 1. The nose wheel angle may be varied to control the direction of travel of the NLG assembly 10, thereby controlling the heading of the aircraft.

Figure 2:
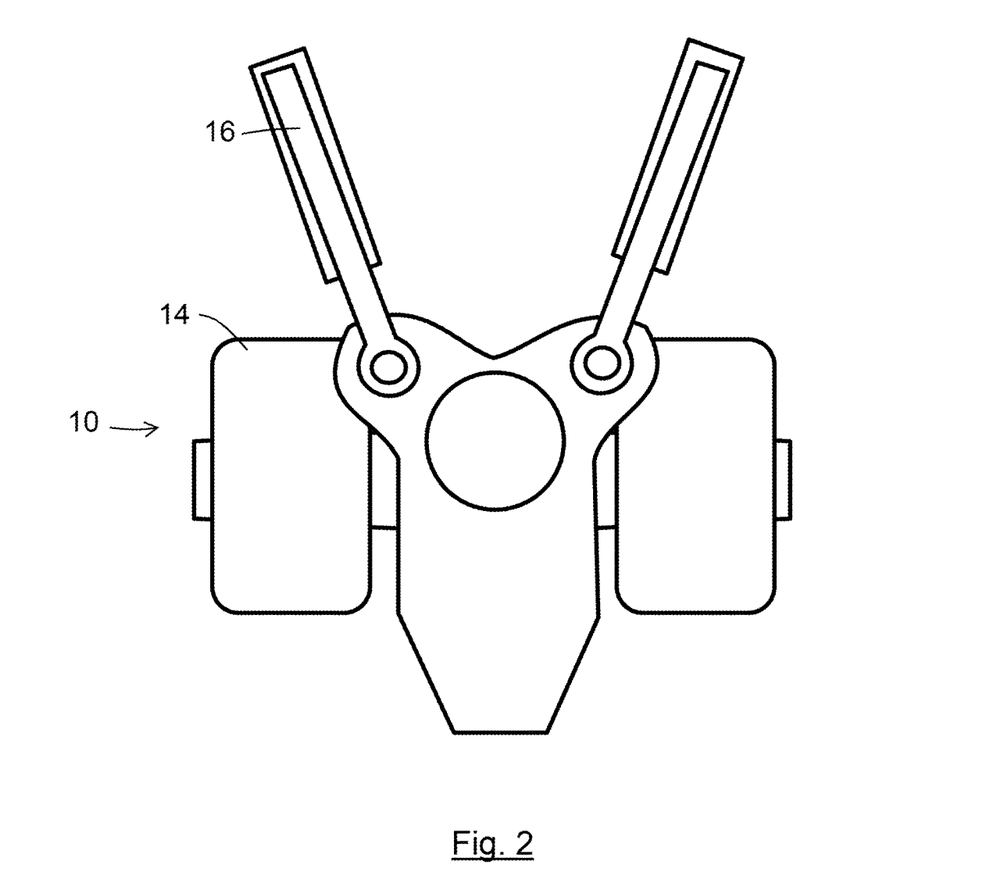
FIG. 2 shows a plan view of the steerable nose landing gear of FIG. 1 with the wheels attached.

FIG. 2 shows the NLG 10 in plan view. The position of the NLG wheels 14 are shown schematically. Actuators 16 are operable to provide steering when the NLG is operating in a directly steerable mode.

The embodiment of the present invention concerns a method of controlling an aircraft when taxiing and the nose landing gear is in a free-to-caster mode. Actuators 16 are not able to be used in the free-to-caster mode. It will be appreciated that an aircraft may be considered as taxiing when it is maneuvering on the ground, for example including landing and take-off maneuvers, as well as other maneuvering on the ground.

Figure 3:
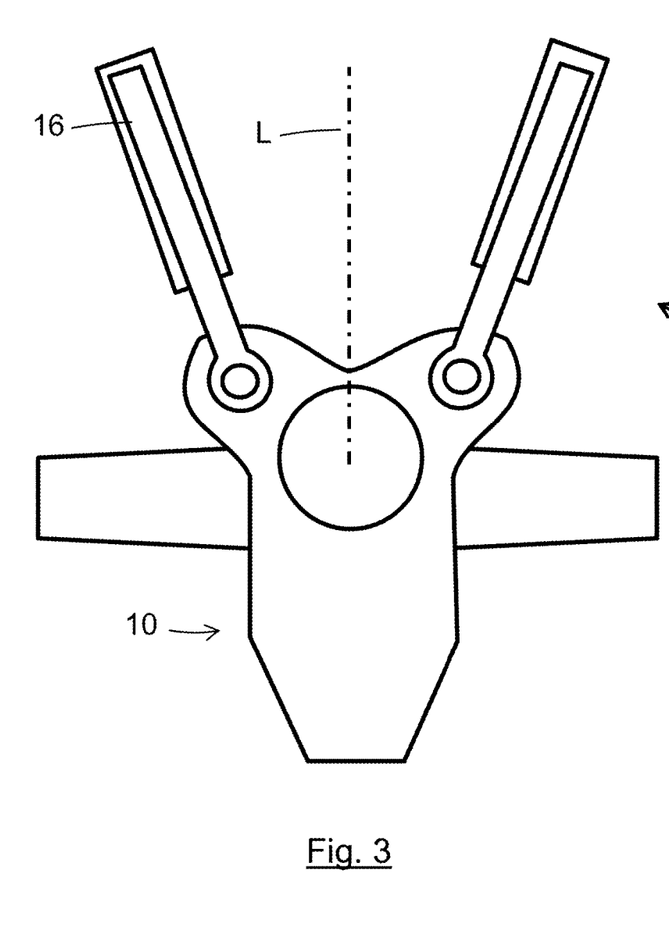
FIG. 3 shows a plan view of the steerable nose landing gear of FIG. 1 in a first rotational position (with the wheels omitted for the sake of clarity)
Figure 4:
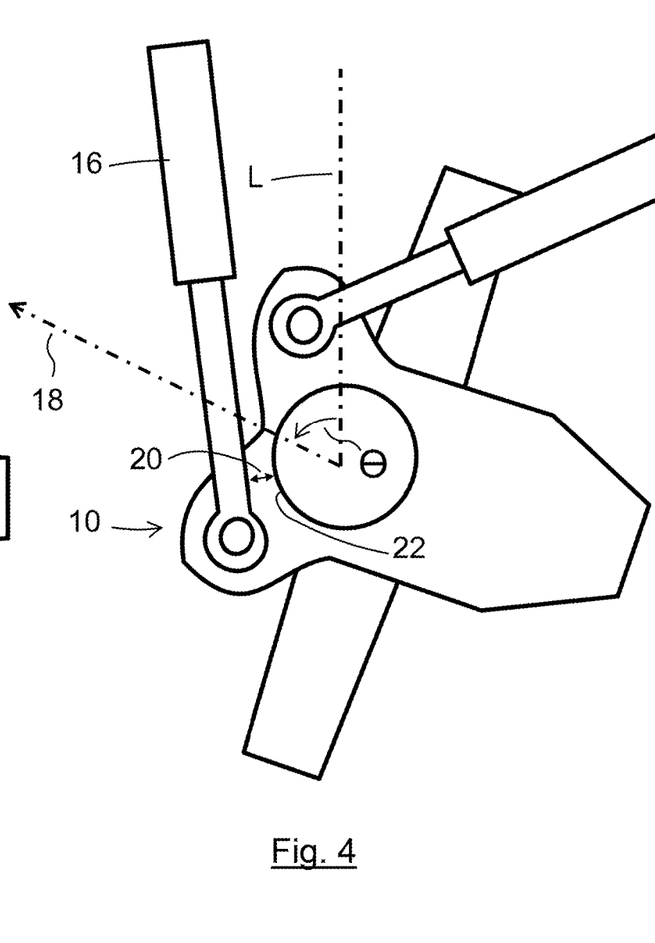
FIG. 4 shows a plan view of the steerable nose landing gear of FIG. 1 in a second rotational position (with the wheels omitted for the sake of clarity)

It is possible when an aircraft maneuvers on the ground with the NLG in a free-to-caster mode, particularly when the aircraft is stopping during a turn, for the steering angle of the NLG to reach 90°. In certain aircraft, this need not present an issue, but in other aircraft there may be a limit on the maximum allowable steering angle. The term "steering angle" is used herein as a short-hand for the angle of the rotational position of the steerable landing gear relative to the longitudinal axis. FIG. 3 shows a NLG positioned to have a steering angle of 0 degrees—corresponding to a direction of travel of the aircraft being straight forward (no turning angle) and parallel to the longitudinal axis (L). FIG. 4 shows a NLG positioned to have a steering angle Θ of about 65 degrees—the angle between the forward rolling direction 18 of the NLG and the longitudinal axis (L). It will be seen that at this angle, the left actuator is very close (see gap represented by double-headed arrow 20) to adjacent structure 22 of the NLG. If the aircraft were maneuvered in such a way to cause the NLG to be urged to adopt a steering angle of more than 80 degrees, damage would be caused (or at least there would be a significantly increased risk of such damage) because the steering actuator then makes contact with other structure of the NLG, representing the mechanical limit of the steering. 80 degrees thus represents the maximum allowable steering angle. The NLG, by having a maximum allowable steering angle of 80 degrees may be of lower mass than an equivalent NLG for which the maximum allowable steering angle is 90 degrees. The present embodiment allows such a lower maximum allowable steering angle whilst managing the risk of damage to the NLG appropriately, particularly the risk of damage to structural elements of the NLG when maneuvering the aircraft during taxi with the NLG in free-to-caster mode (which may occur, for example, due to loss of the NLG Wheel Steering Control System).

Figure 5:
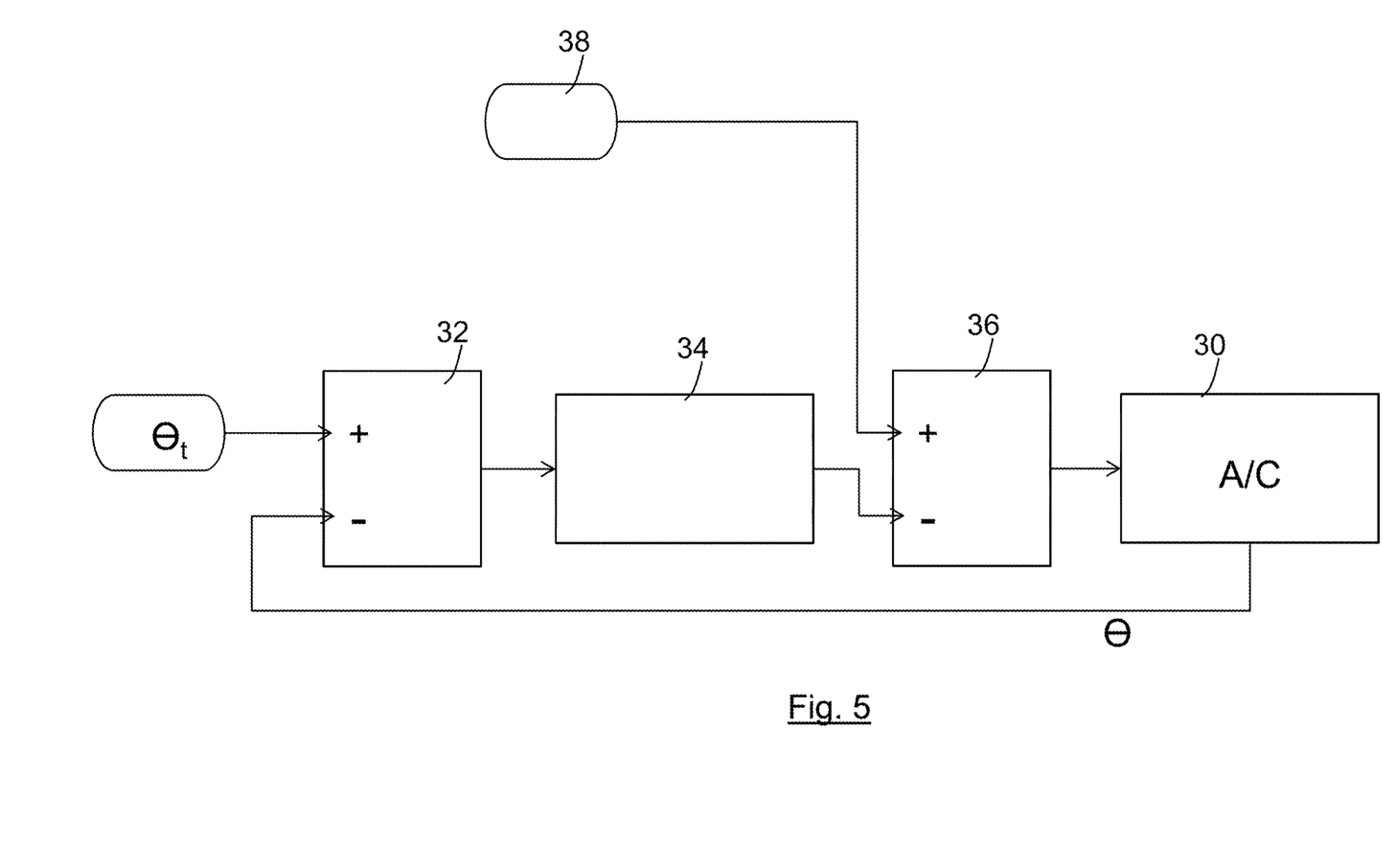
FIG. 5 shows the control logic effected according to the embodiment.

The present embodiment provides a method of controlling the steering/turning of the aircraft. The logic of the control system employed is shown in FIG. 5. The control system is in the form of a computer-implemented system, with associated software. The steering angle Θ of the NLG of the A/C (represented by box 30) is ascertained by means the knowledge of the velocity vector of the aircraft (but could be ascertained directly by an appropriate transducer on the NLG). This is then compared (box 32) with a pre-set threshold value Θt, which in this case is set to 30 degrees. If the steering angle (the absolute value, ignoring sign of the angle) is above 30 degrees then the difference is scaled by a gain factor (box 34) and converted to a brake reduction value. The gain in this case is 10 bar reduction per degree over the threshold value Θt. A pilot requests a given level (box 38) of differential braking on the MLGs, by operating braking pedals in the cockpit. The braking pedals generate signals corresponding to the level of braking instructed by the pilot. The resulting requested levels of differential braking from the pilot (as represented in pressure of hydraulic braking fluid pressure) on the MLG to the side (left or right) that will reduce the steering angle if the braking on that side is reduced, is then reduced (box 36) by the brake reduction value (or reduced to zero if the braking level requested is less than the absolute brake reduction value). The brake reduction value may be considered as being equal to an amount of "excessive braking". The resultant, modified, braking instructions are then applied to the MLGs of the aircraft (represented by box 30). If the steering angle is below the 30 degree threshold, the requested braking is effected without modification (which may serve to limit the system's impact on normal operation where the steering angle is not at risk of being subjected to runaway).

The system thus modulates the braking pressure (the braking torque or braking force could alternatively be similarly modulated) to reduce the chance of (or prevent) the NLG steering angle diverging to excessive steering angles, as might otherwise occur—for example while the aircraft is stopping due to braking demands (e.g. pedal braking, autobrake, etc.) This is achieved by modifying the braking instruction by reducing the braking demanded on the side (left or right) of the aircraft that would otherwise contribute to the runaway of the steering of the NLG (i.e. if runaway is to left hand side, then braking is removed from the left hand side of the aircraft Thus, the embodiment of the invention described above automatically provides protection to the NLG steering system by ensuring that it remains in its normal range of steering angles when in free-to-castor mode. The embodiment provides the significant advantage of protecting the NLG when the pilot is turning the aircraft by alternative means (such as differential braking). Currently, using alternative steering mechanisms (such as differential braking) to control the aircraft maneuvers when the NLG is in free-to-castor requires high piloting attention—to ensure the pilot will not damage the NLG. An automatic protection of the NLG structure by limiting the maximum NLG steering angle will allow the pilot to manoeuvre the aircraft with more confidence, will limit the risk of NLG actuator damage, limit the risk of taxiway excursion, and reduce taxi times when operating the aircraft in this situation (thereby reducing fuel costs).

Whilst the present invention has been described and illustrated with reference to a particular embodiment, it will be appreciated by those of ordinary skill in the art that the invention lends itself to many different variations not specifically illustrated herein. By way of example only, certain possible variations will now be described.

The system could also modulate the braking instruction by removing a proportion of "excessive braking" on one side and adding the remainder of the "excessive braking" on the other to keep the requested level of global braking substantially the same.

Whilst the computation of the "excessive braking" (the brake reduction value) may be proportional to the difference between the steering angle and the threshold angle, a more complex law to take in to account non-linearity, pilot feel and dynamic effects may be employed.

The braking orders may originate from an aircraft system that translates the operation of a NLG steering tiller in the cockpit into actions of differential braking on the MLGs and/or differential operation of the propulsion engines on the aircraft.

Other systems that effect turning of the aircraft that do not utilise the direct steering of the NLG may be controlled in a similar way. For example, if there are left and right jet engines, the thrust generated by each may be controlled to provide differential thrust on the aircraft.

The above embodiment may comprise a comparator unit, to determine the difference between the threshold angle and the NLG steering angle. Such a comparator unit may comprise an electronic circuit, for example comprising a simple potential divider or Wheatstone bridge. The electronic circuit may be integrated with other circuitry of the aircraft. The comparator unit may comprise a logic arrangement. The comparator unit may be implemented in software. Similarly the gain applied by the step represented by box 34 may be performed by use of an electronic amplifier, or could alternatively be implemented in software. Thus, the entire control system could be implemented by means of an electronic circuit without any software being used to program the system.

Signals may be used in embodiments of the invention, such as electrical signals, such as for example a voltage, to convey data, for example the value of the angle of the NLG. Such signals may include mechanical signals such as movement of a gear or lever. In addition, it will be understood that a state of a "signal" may include zero, in which state there is no physical signal, as such. For example the states of an electric signal may include 0 volts.

In other embodiments, the aircraft may comprise one or more further MLG assemblies.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

The invention claimed is:

1. A method of controlling the motion of an aircraft having a longitudinal axis during taxiing on the ground, wherein the aircraft comprises:
   a steerable landing gear comprising one or more wheels positioned at a fore end of the aircraft, the steerable landing gear operating in a free-to-caster mode during performance of the method,
   one or more left main landing gears, each comprising one or more wheels and being positioned rearwardly and to the left of the steerable landing gear, and
   one or more right main landing gears each comprising one or more wheels and being positioned rearwardly and to the right of the steerable landing gear, and
   the method comprises the following steps, performed whilst the aircraft is turning in a direction away from the longitudinal axis of the aircraft, the rotational position of the steerable landing gear being non-parallel to the longitudinal axis:
      ascertaining the rotational position of the steerable landing gear relative to the longitudinal axis of the aircraft,
      receiving a control instruction that would, if effected, continue turning of the aircraft in the direction away from the longitudinal axis, and
      in response to the rotational position being greater than a threshold angle, modifying the control instruction so that the angle between the rotational position of the steerable landing gear and the longitudinal axis will be lower than the angle that would otherwise be observed had the control instruction been effected and not so modified;
      whereby the risk of damage to the steerable landing gear through over-steering is reduced.

2. The method according to claim 1, wherein the amount by which the control instruction is modified is greater at a first angle between the rotational position of the steerable landing gear and the longitudinal axis than at a second angle between the rotational position of the steerable landing gear and the longitudinal axis, the first angle being greater than the second angle, which is greater than the threshold angle.

3. The method according to claim 1, wherein, between the threshold angle and a higher angle, the amount by which the control instruction is modified increases monotonically with increasing angle between the rotational position of the steerable landing gear and the longitudinal axis.

4. The method according to claim 3, wherein, between the threshold angle and the higher angle, the amount by which the control instruction is modified increases proportionally with increasing angle between the rotational position of the steerable landing gear and the longitudinal axis.

5. The method according to claim 1, wherein the control instruction received comprises an instruction to effect differential braking to the main landing gears.

6. The method according to claim 1, wherein the control instruction received comprises an instruction to effect at least one of (a) differential braking to the main landing gears and (b) differential thrust from left and right engines of the aircraft,
   such that there is an imbalance between the forces to be applied to the left of the aircraft as compared to the right of the aircraft, and
   the step of modifying the control instruction includes reducing the imbalance by changing the control instruction insofar as it affects the left of the aircraft and also reducing the imbalance by changing the control instruction insofar as it affects the right of the aircraft.

7. The method according to claim 1, wherein the control instruction received comprises an instruction that would effect braking and turning of the aircraft and wherein the step of modifying the control instruction results in substantially the same overall amount of braking, but reduced turning.

8. The method according to claim 1, wherein the aircraft is configured such that the steerable landing gear is operable in a directly steerable mode, the command instructions for controlling the rotational position of the steerable landing gear being provided by means of a human-operated moveable steering device in the cockpit, and wherein the control instruction received originates from a human operator of the aircraft operating the same human-operated moveable steering device.

9. The method according to claim 1, wherein the control instruction received is provided from an electronic aircraft control system seeking to effect a desired amount of turning.

10. The method according to claim 1, wherein the control instruction received is provided as a result of a human operator seeking to effect steering of the aircraft by means of performing one or more of the following actions:
    (a) changing the thrust provided by one or more engines for providing forward thrust during flight,
    (b) changing the amount of braking applied to one or more of the main landing gears, and
    (c) changing an aerodynamic surface on the aircraft.

11. A non-transitory memory device storing a computer program product configured to cause, when the computer program is executed, a computer implemented aircraft steering control system to perform the step of modifying of the control instruction as claimed in the method of claim 1.

* * * * *